I. PITKOWSKY.
MACHINE FOR MAKING PAPER RECEPTACLES.
APPLICATION FILED MAR. 20, 1914.

1,190,669.

Patented July 11, 1916.
7 SHEETS—SHEET 1.

WITNESSES

INVENTOR
I. Pitkowsky
BY
his ATTORNEY

I. PITKOWSKY.
MACHINE FOR MAKING PAPER RECEPTACLES.
APPLICATION FILED MAR. 20, 1914.

1,190,669.

Patented July 11, 1916.
7 SHEETS—SHEET 2.

Fig. 2.

WITNESSES

INVENTOR
I. Pitkowsky
BY
his ATTORNEY

UNITED STATES PATENT OFFICE.

ISRAEL PITKOWSKY, OF NEW YORK, N. Y., ASSIGNOR, BY DIRECT AND MESNE ASSIGNMENTS, TO CRESCENT PAPER BUTTER DISH CO., INC.

MACHINE FOR MAKING PAPER RECEPTACLES.

1,190,669. Specification of Letters Patent. Patented July 11, 1916.

Application filed March 20, 1914. Serial No. 825,997.

*To all whom it may concern:*

Be it known that I, ISRAEL PITKOWSKY, a subject of the Czar of Russia, and resident of New York city, borough of Brooklyn, in the county of Kings and State of New York, have invented certain new and useful Improvements in Machines for Making Paper Receptacles, of which the following is a specification.

The object of my invention is to provide a machine adapted to expeditiously make receptacles, such as butter dishes, of paper or analogous material, wherein such receptacles are properly cut and scored, folded to the required shape, and portions thereof fastened together by staples or the like, and to assemble such receptacles and pass them to a place of support.

My invention comprises novel details of improvement and combinations of parts that will be more fully hereinafter set forth and then pointed out in the claims.

Reference is to be had to the accompanying drawings forming part hereof, wherein.

Similar numerals of reference indicate corresponding parts in the several views.

In the drawings the numeral 1 indicates a frame, shown provided with a platform or plate 1ª upon which various parts of the machine are supported.

2 indicates a transversely disposed drive shaft mounted in suitable bearings upon the frame and shown provided with drive pulley 3 and a hand wheel 4 for rotating said shaft as desired. At 5 is a shaft mounted in suitable bearings in the frame and shown extending longitudinally thereof, suitable gearing 6, 7, connecting said shaft for rotating one by the other.

Figures 6, 10, 11, 12, 13:
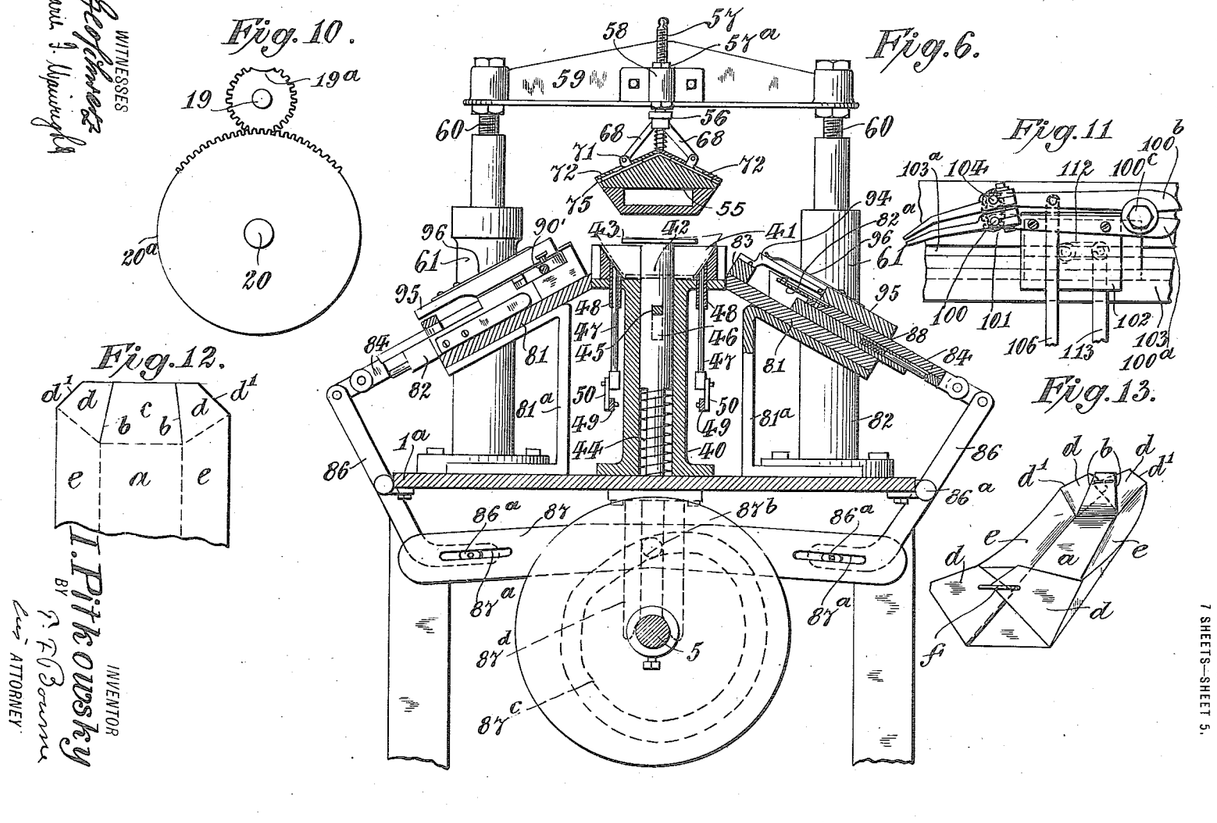
Fig. 6 is a cross section substantially on the line 6, 6, in Fig. 2, part of the section being at a point beyond said line in the direction of the arrows $b$, $b$.
Fig. 10 is a detail of gears hereinafter described.
Fig. 11 is a detail, illustrating gripper 100.
Fig. 12 is a plan of a portion of a blank for forming a butter dish on the machine.
Fig. 13 is a perspective of one of such dishes complete.

In accordance with my invention a reel of paper 8 may be supported upon suitable brackets or the like 9, and said paper is passed from said reel over a roll 10 and beneath one or more rods or wires 11, and thence between feed rolls 12, 13 that are shown geared together by gears 14, 15. Roll 10 is shown supported by arms 16 and rods 11 supported by arms 17 that are carried by spaced uprights 18 that are secured upon platform 1ª. Feed rolls 12, 13 are also journaled upon said uprights. Feed roll 12 is shown provided with a pinion 19 in mesh with a partial gear 20 that is carried by a shaft 21 journaled upon the uprights 18, which shaft carries a gear 22 in mesh with a gear 23 on a shaft 24 journaled upon platform 1ª which shaft 24 has a gear 25 in mesh with a gear 26 secured upon shaft 5. By the means described the feed rolls 12, 13 are given an intermittent motion for intermittently feeding the paper strip, and the parts 10, 11 serve to prevent such paper strip, at its part between its reel and the rolls 12, 13, from over-running or buckling adjacent to said feed rolls. Suitable means are provided for causing roll 13 to press resiliently against the paper strip passing over roll 12, for which purpose I have shown adjustable screws 13ª provided with springs 13ᵇ, serving to elastically press roll 13 toward roll 12.

Spaced from the feed rolls 12, 13 are devices for scoring, slitting and cutting off portions of the paper strip for forming the blank (partly shown in Fig. 12) from which the paper receptacle or dish shown in Fig.

Figure 5:
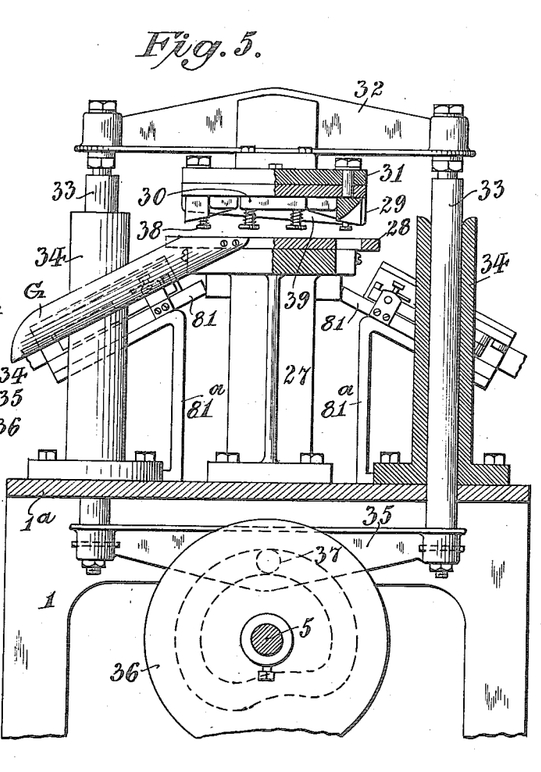
Fig. 5 is a cross section, substantially on the line 5, 5, in Fig. 2, part of the section being at a point beyond said line in the direction of the arrows $a$, $a$.
Figure 21:
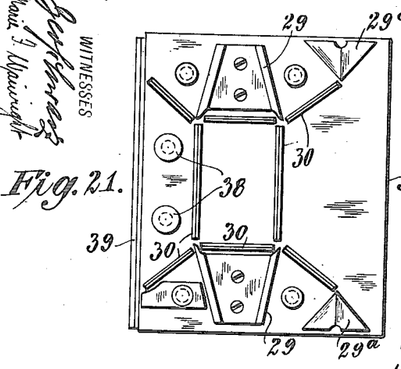
Figs. 21 and 22 are, respectively, inverted plan and plan views of devices for cutting and scoring blanks for the dishes.
Figure 22:
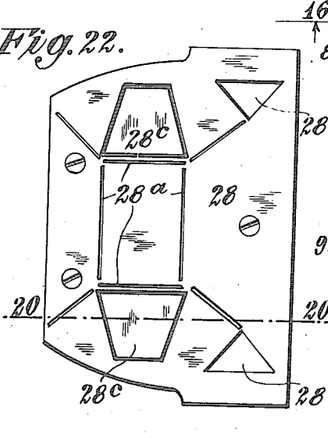

13 is to be formed. As illustrated in Fig. 12 the blank $a$ is slit at $b$, $b$, (at opposite ends) and scored or weakened along the dotted lines, to provide the central end flaps $c$ and the adjacent wings $d$, $d$. Wings $d$ are to be folded against the adjacent flaps $c$ and secured together by staples or the like, as hereinafter explained. To this end I provide a standard 27 secured upon platform $1^a$, upon which is located a suitable die 28, having appropriate grooves or slots $28^a$ and openings $28^b$ (Figs. 3, 5 and 22), over which die are reciprocative cutting and scoring knives or the like 29, $29^a$, 30 (Figs. 3, 5 and 21), corresponding to the die and properly shaped, in any well known manner, to coact therewith, to cut and score the paper, in the manner described with respect to Fig. 12, at each depression of the parts 29 and 30. The spring actuated plates $28^c$, of die 28, raise the cut wings $d$. The last named parts are suitably secured upon a reciprocative head or block 31 shown carried by a cross bar 32, having its ends connected to reciprocative rods 33 guided in standards 34 secured upon platform $1^a$, the lower ends of said rods being connected by bar 35.

At 36 is a cam, suitably secured upon shaft 5 and operatively connected with bar 35, as by pin 37 (Fig. 5), whereby the cutting and scoring devices will be raised and lowered in proper time.

At 38 are spring actuated plungers carried by head or block 31 to bear on the paper passing over die 28 to retain the latter set during the cutting and scoring thereof.

At 39 is a cutter or knife, shown connected with block 31, adapted to coact with an edge of die 28 to cut off blanks from the paper strip after they have been cut and scored on the required lines.

The feeding of the paper strip is to be step by step, in accordance with the operations of the cutting and scoring devices, and to this end I have shown gear 20 provided with a suitable number of teeth around its periphery, leaving an untoothed portion $20^a$ adapted to coact with an untoothed, inwardly curved portion $19^a$ of pinion 19 (Fig. 10), the arrangement being such that when the cutters are raised from die 28 the feed rolls 12, 13 will feed the paper strip forwardly, and when such strip is being cut and scored for a blank, and dish forming operations are being performed upon a different blank, the curved part $19^a$ of pinion 19 will rest upon the uncut periphery $20^a$ of gear 20, and the feed rolls will come to rest, and so on step by step.

At G are chutes at opposed corners of die 28 under openings $28^a$ to receive pieces of the blank cut out by the angled cutters $29^a$ to form angled corners $d'$ on the blanks and dishes (Figs. 12 and 13).

Figure 1:
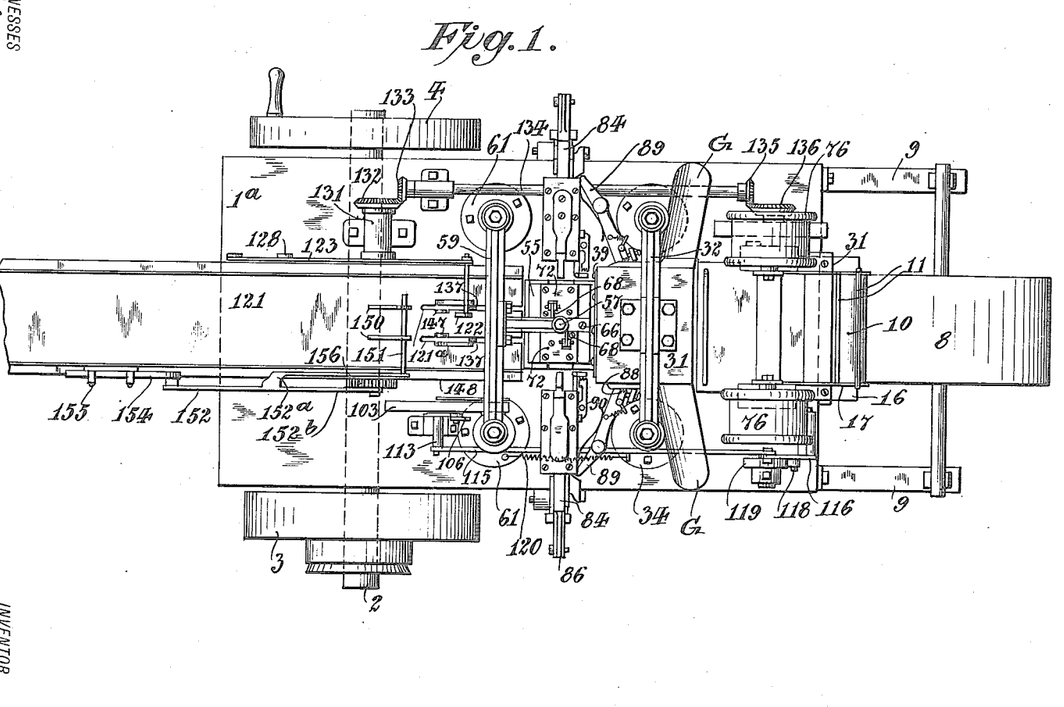
Figure 1 is a plan view of a machine embodying my invention.
Figure 2:
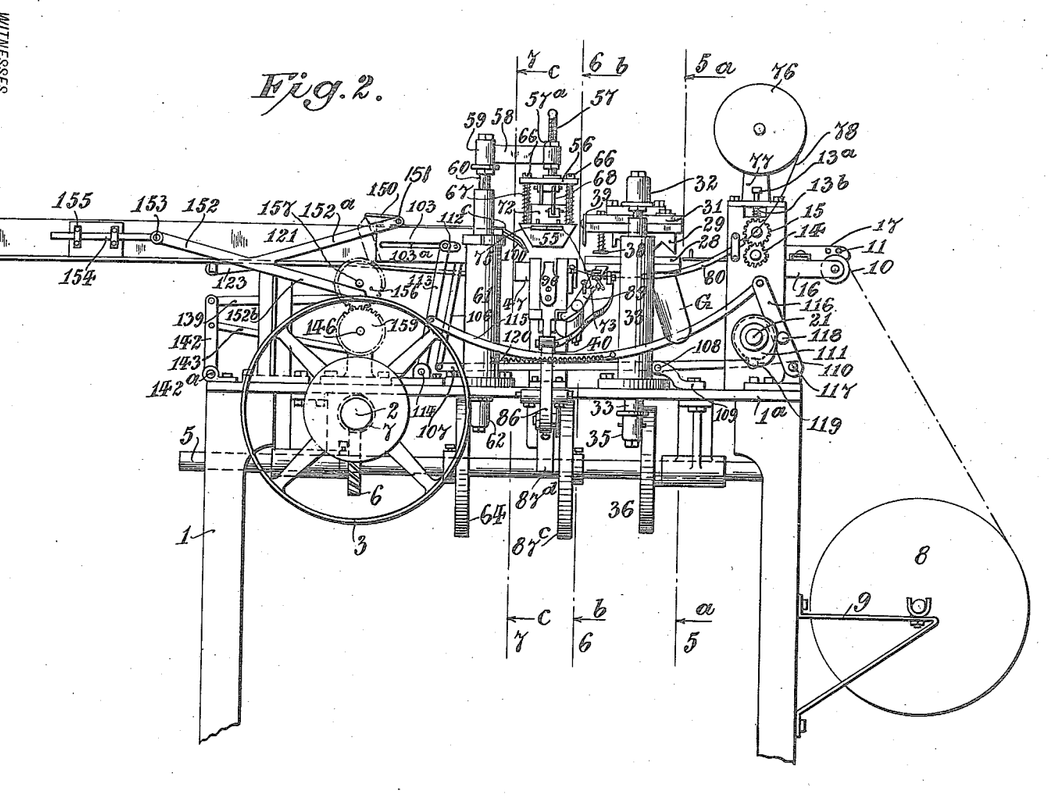
Fig. 2 is a side elevation thereof.
Figure 8:
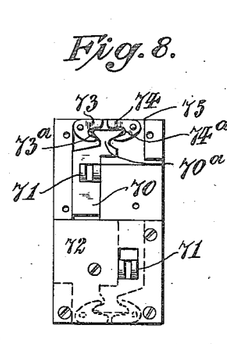
Figs. 8 and 9 are details of part of the staple clenching devices.
Figure 9:
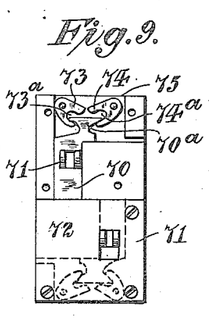

Adjacent to die 28, and at its side opposite the feed rolls, the dish forming and stapling devices are arranged and operated as follows: At 40 is a standard secured upon platform $1^a$, and provided with a female forming die 41 corresponding to the shape of the dish to be formed (see Figs. 3 and 6), the upper edge of die 41 being slightly below the plane of the top surface of die 28. Guided within standard 40 and die 41 is a dish discharging ejector 42, shown having a top plate 43, said ejector being normally pressed upwardly by a spring 44, the lower end of ejector 42 being adapted to pass through a suitable hole in platform $1^a$. A pin 45 passing through said ejector and through slots 46 in standard 40 serves to limit the upward movement of the ejector. At opposite ends of die 41 are grippers 47 (Fig. 6) which are guided for vertical movement in suitable guideways 48 carried by standard 40 and adapted to enter die 41, the upper ends of said grippers being preferably beveled to substantially correspond to the adjacent beveled or tapering inner surfaces of die 41. The grippers 47 are adapted to be raised to grip the end flaps $c$ of the blank, when it is being pressed and folded to shape, and while its end members are being stapled together, for which purpose a forked lever 49 is shown connected by links 50 (Fig. 6) with grippers 47, which lever 49 is pivotally supported at $49^a$ upon standard 51 secured upon platform $1^a$ (Fig. 3), the free end of said lever being drawn by spring 52 into engagement with the cam 53 secured on shaft 21 (see Fig. 4), whereby as said cam rotates, the grippers 47 are pushed by the action of spring 52 and lever 49 into engagement with the flaps $c$ and released therefrom at the proper time, as hereinafter explained. Above die 41 is a suitably shaped plunger 55, substantially of the general contour of the dish to be formed, which plunger 55 is operative above die 41 to press a cut and scored blank into the latter. Plunger 55 also is provided with means for clenching staples at the ends of the dish while the latter is within die 41. Plunger 55 is flexibly supported by or suspended from a bar 56 that is attached to an adjustable screw rod 57, carried by an arm 58 projecting from the cross bar 59 that is carried by reciprocative rods 60. Nuts $57^a$ on rod 57 permit vertical adjustment of plunger 55 with respect to die 41 or cross bar 59. Rods 60 are guided in standards 61 secured on platform $1^a$, and the lower ends of said rods are connected by a cross bar 62 that is provided with a pin or roller 63 operated by a cam 64 secured on shaft 5 (Figs. 3 and 7), whereby plunger 55 may be raised and lowered and retarded in certain positions, as hereinafter explained. Plunger 55 is connected with rods 66 that are guided to slide in holes in bar 56 and have heads normally resting on said bar, springs 67 interposed between bar 56 and plunger 55 serving normally to depress the latter and permit the independent descent of bar 56 when the plunger bears upon a blank within die 41. To bar 56 oppositely disposed links 68 are pivotally connected at their upper ends, and at their lower ends said links are pivotally connected to slides 70 (Figs. 8 and 9), by means of the lugs 71 that project through slots in the covers 72, secured by screws upon the top of plunger 5 (Figs. 1, 2 and 6). The slides 70 extend in opposite directions, and coact with staple clenching members 73, 74 that are pivotally supported within recesses in the upper portion of plunger 55 and have recesses 73$^a$, 74$^a$, respectively, receiving the head 70$^a$ of the corresponding slides 70 for rocking said members 73, 74. The outer operating surfaces of the members 73, 74 aline with the corresponding opening 75 (Figs. 2, 6 and 9) in the edges of plunger 55 beneath the corresponding edges of covers 72, whereby said members may engage staple ends. From this it will be understood that when cross bar 59 rises and raises bar 56, the plunger 55 will be raised and the links 68 will cause the slides 70 to be drawn back and the members 73, 74 to be drawn inwardly, as in Fig. 9, and when plunger 55 is depressed into the die 41, it comes to rest upon a blank and folds the latter therein, and a further downward movement of bar 56 will cause the links 68 to push the slides 70 in a downward and outward direction, thereby pushing the members 73, 74 in a corresponding direction, to clench the staple ends then projecting through the corresponding parts of the formed dish blank, as presently described.

Figures 15, 16, 17, 18, 19, 20:
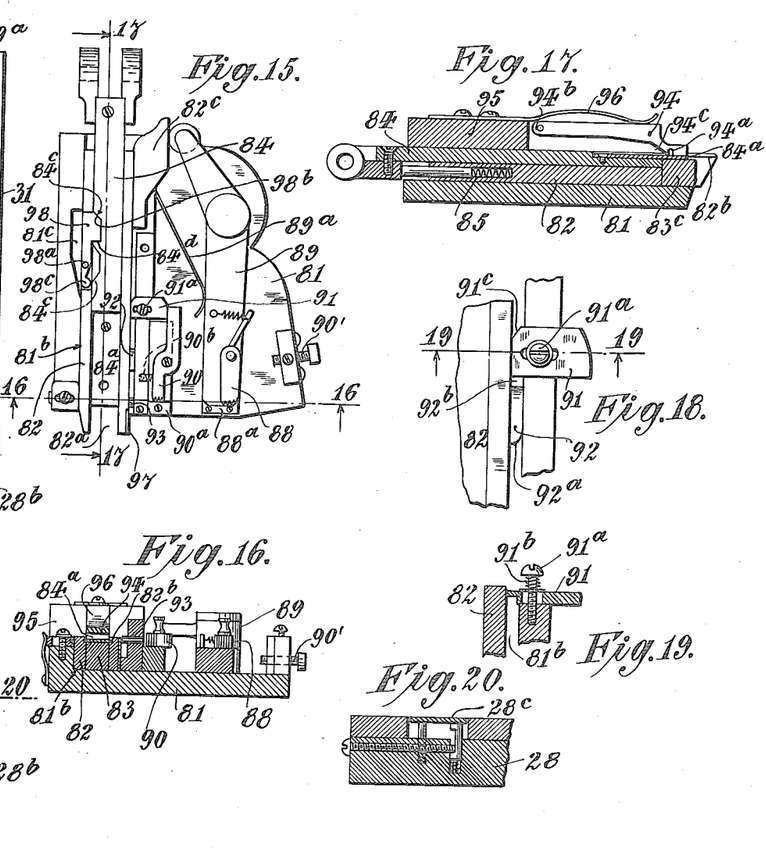
Fig. 15 is a similar view showing the parts in different positions.
Fig. 16 is a section on the line 16, 16, in Fig. 15.
Fig. 17 is a section on the line 17, 17, in Fig. 15.
Fig. 18 is an enlarged detail plan.
Fig. 19 is a section on the line 19, 19, in Fig. 18.
Fig. 20 is a detail section on line 20, 20, of Fig. 22.

Any suitable means may be provided for supplying staples in position to be projected through the folded end members of the dish blank, while the latter is within die 41, the staple ends entering the spaces 75 at the ends of plunger 55. For this purpose I have shown reels 76 rotatively mounted upon supports 77 guided by uprights 18, wires 78 from the reels passing through guides 79, and tubes 80 (Figs. 2 and 4) to staple forming and driving devices on opposite sides of die 41. Means for this purpose are more fully shown in detail in Figs. 14 to 20, and as the staple forming and driving devices are similar on opposite sides of the machine, it will suffice to describe one set thereof, it being understood, however, that they are made in a substantially right-and-left-hand manner. Plate 81 is supported in an inclined manner upon upright 81$^a$ secured upon platform 1$^a$, and is provided with a guideway 81$^b$ (Fig. 16) in which a staple bending slide 82 is guided. Slide 82 is forked on one end at 82$^a$ to straddle a block 83 secured on plate 81. Slide 82 is recessed on top to receive a staple driver 84 having a relatively thin driving head 84$^a$ projecting from one end thereof adapted to pass over block 83 (Fig. 17). Driving head 84$^a$ is guided at its edges in grooves 82$^b$ in slide 82 (Fig. 16) into which the bent ends of staples pass. Slide 82 and driver 84 have independent relative movement and are normally held spaced as in Fig. 14 by a spring 85 (Fig. 17). Each driver 84 is pivotally connected with a lever 86 pivotally supported upon platform 1$^a$, at 86$^a$, and provided with pins or rollers 86$^b$ entering slots 87$^a$ in bar 87 (Fig. 6), which bar has a pin or roller 87$^b$ engaging a cam 87$^c$ secured on shaft 5, said bar being guided by a fork 87$^d$ straddling said shaft, whereby, as said cam rotates and bar 87 is reciprocated the levers 86 will be rocked to simultaneously reciprocate the respective drivers 84. The wire 78 is fed by a spring-actuated gripper 88 pivotally carried on an arm 89 pivotally supported on plate 81 and rocked by a cam 82$^c$ secured upon slide 82. An adjustable stop 90' secured on plate 81 serves to cause wire gripper 88 to move slightly away from the abutment 88$^a$ on arm 89 when the parts are in the position shown in Fig. 14, and gripper 88 closes against the wire to feed it when arm 89 is, by cam 82$^c$, moved away from said stop, whereby gripper 88 grips the wire against abutment 88$^a$ (Fig. 15). A spring 89$^a$ acts with arm 89 against cam 82$^c$. At 90 is a wire gripper or retainer pivotally supported upon plate 81 and adapted to coact with an abutment 90$^a$, on said plate, to grip the wire when arm 89 moves toward stop 90' and to release the wire when it is to be fed. A spring 90$^b$ (Figs. 14 and 15) serves to push gripper 90 away from the wire and a sliding plate 91 serves to push the gripper against the wire. Said plate is slotted and retained by a screw 91$^a$ and a spring 91$^b$ (Fig. 19), which spring serves to hold the plate normally down upon the corresponding wall of guideway 81$^b$. The slide 82 on one side has a cam-like projection 92, provided with a beveled edge 92$^a$ (Fig. 18), adapted, when first moving forwardly on the driving stroke, to engage the beveled edge 91$^c$ of plate 91 to push or slide it to rock gripper 90 into releasing engagement with the wire, at which time cam 82$^c$ rocks arm 89 to feed the wire, and then as the driver proceeds the cam 82$^c$ releases plate 91, and gripper 90 again engages the fed wire, and when the slide moves reversely the beveled edge 92$^b$ of cam 92 (Fig. 18) enables the cam to slide under plate 91 by tilting it, so as then not to operate the gripper 90. In register with the toothed end of gripper 90 is a wire guiding tube 93 (Fig. 16) to guide the wire into a slot 94$^a$ in an anvil 94 pivotally supported at 94$^b$ on a cap or plate 95 (Fig. 17) secured on the side wall of guideway 81$^b$. Spring 96 normally holds the anvil down upon block 83 with slot 94ᵃ in position to receive the wire from guide 93 when the driver 84 is retracted. The under edge of anvil 94 is shown beveled at 94ᶜ to permit the driving head 84ᵃ to raise the anvil to release the staple from the lower open end of slot 94ᵃ as the driver advances.

The slide 82 carries a knife or cutter 97, adapted, when passing tube 93, to cut off a piece of the wire that is then located in slot 94ᵃ, to form a staple length. Upon the slide 82 is a latch 98 pivoted at 98ᵃ, and driver 84 has a recess receiving said latch and provided with an inclined edge 84ᶜ to engage the correspondingly inclined edge 98ᵇ of latch 98, and said driver also has a projection 84ᵈ and an inclined edge 84ᵉ to coact with the rounded end portion 98ᶜ of latch 98. The side wall of guideway 81ᵇ is provided with a recess 81ᶜ in which the latch 98 may enter. When the parts are retracted or in the normal positions (Fig. 14), and the driver 84 first advances, the spring 85 causes slide 82 to correspondingly advance, and when latch 98 registers with recess 81ᶜ said latch is tilted by the edge 84ᶜ engaging the edge 98ᵇ, to permit the driver to advance when the slide comes to rest as in Fig. 15, to permit the driver to advance farther to drive a staple, and then on the return stroke of the driver its edge 84ᵉ engages the part 98ᶜ of the latch and tilts the latch back to the normal position to cause the driver to pull the slide back with it.

When driver 84 advances, and by means of springs 85 it in turn advances slide 82, the cam 92 pushes plate 91 to cause gripper 90 to release the wire, and arm 89 pushes the wire through guide 93 in front of slide 82 and driver head 84ᵃ and comes to rest; thereupon the advancing knife 97 cuts off a length of wire, and the forked end of slide 82 bends the cut-off wire into staple form while such cut off wire is in the slot 94ᵃ of anvil 94, causing the legs of the staple to enter grooves 82ᵇ, and thereupon driver 84ᵃ passes under anvil 94 and lifts it so that the slot 94ᵃ rises from the staple and releases it from the anvil; as slide 82 and driver 84 continue to move, substantially to the position shown in Fig. 15, the slide comes to rest with the staple ends opposed to the folded dish-blank in die 41, and then a continued movement of driver 84, independent of the slide, causes the staples to be pushed through the folded members $c$, $d$, of the formed dish. The driver 84 now comes to rest and the clenchers 73, 74 operate to clench the staple ends within and complete the dish. When the driver next returns toward normal it first moves independently of slide 82 until the edge 84ᵉ tilts latch 98 to the position shown in Fig. 15 and projection 84ᵈ engages the latch, and a continued movement of the driver then draws the slide with it, whereupon cam 92 passes under plate 91; gripper 90 now holds the wire, and arm 89 returns to normal, its gripper 88 sliding along the wire until stop 90′ is encountered and the gripper 88 is jammed against the wire to feed the same on the next return stroke of arm 89, and so on each time a blank is folded in die 41.

Figure 3:
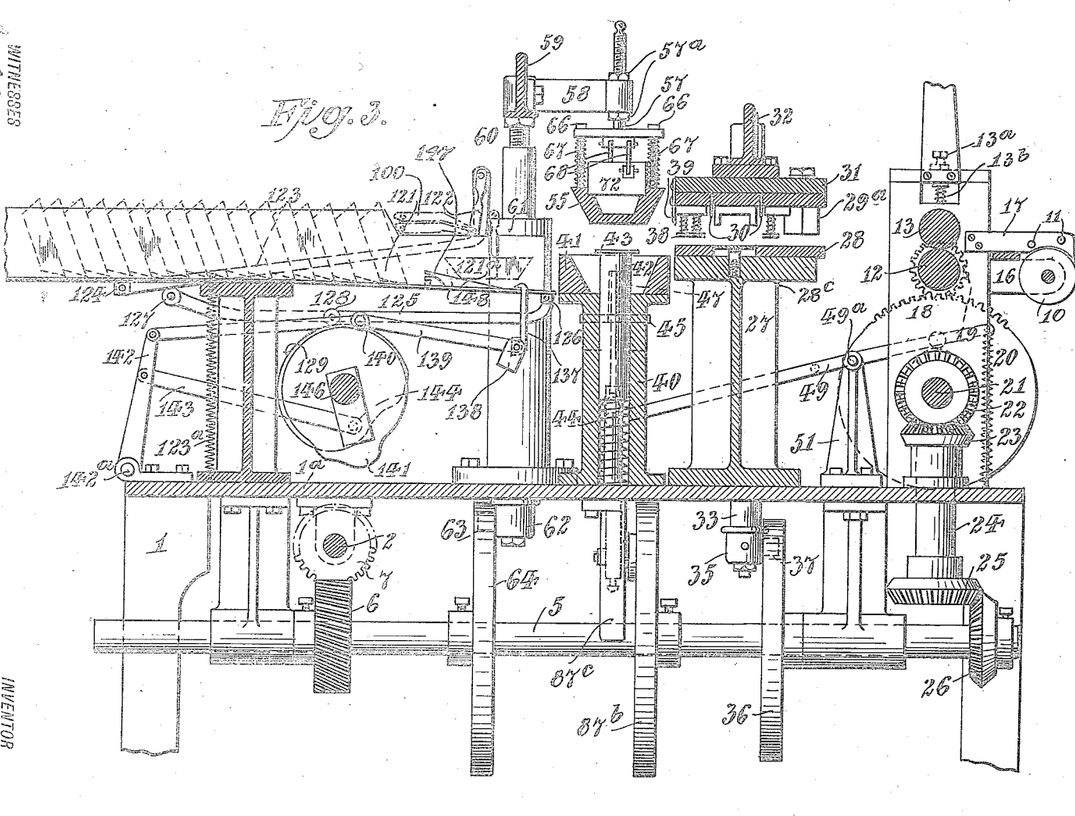
Fig. 3 is a substantially central section of a portion of the machine, parts being removed.
Figure 4:
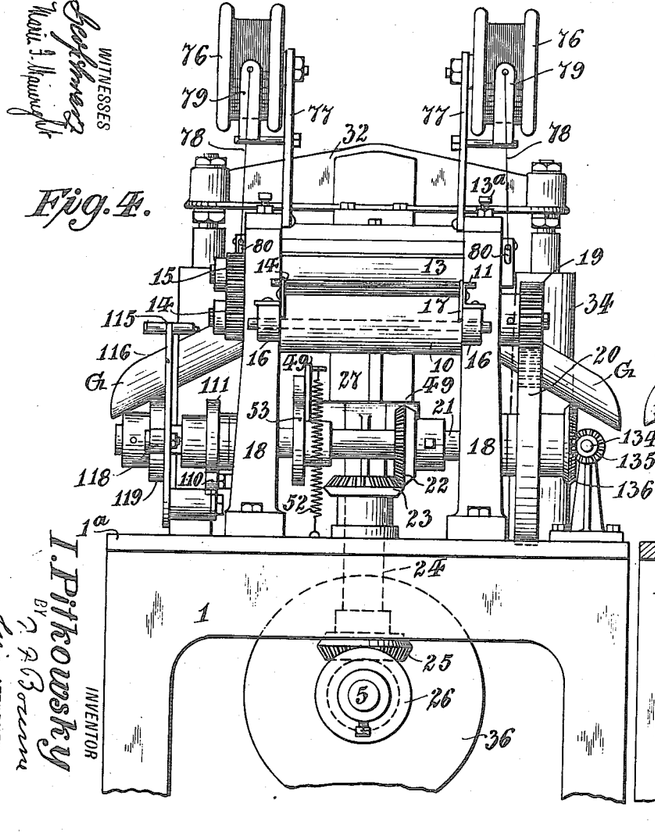
Fig. 4 is an end elevation.
Figures 7, 14:
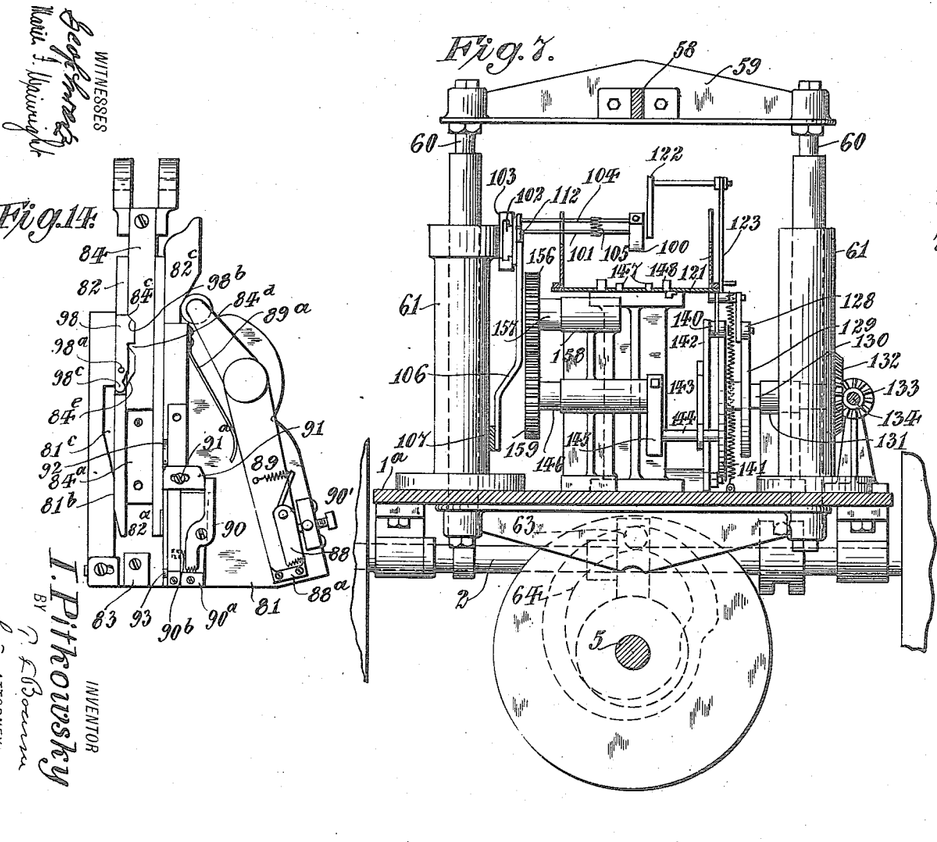
Fig. 7 is a section substantially on the line 7, 7, in Fig. 2, looking in the direction of the arrows $c$, $c$.
Fig. 14 is a detail of part of the staple forming and setting devices.

After the blank has been formed to shape and stapled at its ends, and plunger 55 rises, the ejector 42 lifts the dish from die 41, and then a gripper 100 (Figs. 2, 7 and 11) moves forward, its jaws open and close upon the edge of the dish, lift it from die 41 and carry it to the left in Fig. 2 into a chute or receptacle for the dishes. As shown in Fig. 11 the lower member 100ᵃ of the gripper is pivotally connected at 100ᶜ with the upper member 100ᵇ. The lower member 100ᵃ of the gripper is carried by a rod 101 that is supported by a slide 102 slidably carried in a guide 103 (Fig. 11) supported upon a standard 61 (Figs. 1, 2 and 7). The upper member 100ᵇ of gripper 100 is connected with a rod 104, a spring 105 interposed between rods 101 and 104 (Fig. 7) serving normally to cause the members of the gripper to close to grip a dish. Rod 104 is rocked by a rod 106 pivotally connected with a lever 107 pivotally supported at 108 on bracket 109 (Fig. 2). The free end of said lever 107 is shown provided with a roller 110 (Fig. 4) adapted to be actuated by a cam 111, on shaft 21, for rocking lever 107. The slide 102 is connected by a link 112 through a slot 103ᵃ (Figs. 2 and 11) with a lever 113, pivoted at 114 and connected by a link 115 with an arm 116 pivoted at 117 and carrying a pin or roller 118 coacting with a cam 119 on shaft 21 (Figs. 2 and 4). A spring 120, connected with link 115 and a suitable stop, causes pin 118 to coact with cam 119 to draw lever 113 to its dish delivering position. When a dish is to be removed from die 41 the parts are so timed that gripper 100 (which may normally remain open) moves forwardly and cam 111 causes rod 106 to rock rod 104 to close the gripper and grip the dish, and lever 113 moves back, carrying along the slide 102 and with it the gripper and dish into the chute or receptacle 121 (see dotted lines Fig. 3), whereupon the gripper members open and release the dish. At such time a dish depositing member 122 descends and engages the dish and carries it down upon the bottom of the chute, (Fig. 3). Member 122 is carried by an arm 123, pivotally supported at 124 upon the chute and drawn down by a spring 123ᵃ (Fig. 3). An arm 125 is pivotally supported at 126 and at its free end has a roller 127 engaging arm 123. Arm 125 also has a roller or projection 128 engaging a cam 129 secured on shaft 130 (Fig. 7) whereby, as said cam rotates, the member 122 will be caused to rise and descend at the proper time. Shaft 130 is journaled in a suitable bearing 131 on platform 1ª (Figs. 1 and 7), and carries a gear 132 in mesh with a gear 133 secured upon shaft 134 carried in suitable bearings on platform 1ª and having a gear 135 in mesh with gear 136 secured on shaft 21, which is a convenient means for rotating shaft 130, but said shaft may be rotated in any other suitable manner.

It is intended that the dishes will be nested on edge, in chute or receptacle 121, and to this end I provide the following arrangement: Fingers 137 (Fig. 3), having weights 138 to balance them, project through slots 121ª in the bottom of chute 121, and are pivotally carried by a suitably shaped arm 139, having a roller 140 normally bearing upon a cam 141 (Fig. 3), the opposite end of said arm being pivotally connected with an arm 142 pivoted at 142ª on platform 1ª, whereby said finger is raised and lowered. Arm 142 is pivotally connected by a link 143 with a pin 144 that is connected with a crank 145 carried by a shaft 146, said pin being shown connected with cam 141, (Fig. 7), whereby when said pin is rotated with said cam the arm 142 will be rocked, and fingers 137 will be raised and lowered and moved back and forth through slots 121ª. The arrangement is such that said fingers rise to engage the edge portion of the dish that is pressed down by member 122, descend to tilt the dish, slide to the left in Fig. 3, pushing the dish before them, while it is inclined, against the nest of dishes and then slide away from the dish to normal position of Fig. 3.

One or more hook-like stops 147 in the bottom of chute or receptacle 121 (Fig. 3), located at one side of one or more inclined pieces 148 in the bottom of the chute, serve to retain the lower edge of a dish when it is pushed by fingers 137. To push the nest of dishes rearwardly through the chute or receptacle, step by step, as they are delivered in position therein, I provide one or more fingers 150, shown carried by a rod 151 (Figs. 1 and 2) that is carried by the upper member 152ª of a forked rod 152, which rod is pivotally connected at 153 with a slide 154 carried in guides 155 secured on the side of chute or receptacle 121. The lower member 152ᵇ of rod 152 is pivotally connected with a gear 156 that is carried by a shaft 157 journaled in bearings on an upright 158 on platform 1ª (Figs. 1, 2 and 7), which gear is in mesh with a gear 159 secured on shaft 146. This arrangement is such that as the shaft 146 rotates, the rod 152 will be reciprocated and the arm 152ª will thus impart to the fingers or pins 150 a substantially rotary motion whereby said fingers or pins will act upon the nested dishes to jar them by engaging and sliding along their upper edges, thereby tucking them together and pushing them along the chute or receptacle 121.

The complete operation may be described as follows: The paper strip from reel 8 is first passed over roll 10, through the feed rolls 12, 13, and between the die 28 and cutting and scoring devices 29, 30. When the machine is first started said devices cut the blank strip on the lines b, cut off the corners d' and score the strip where necessary, and then said devices rise and the strip is fed to bring such cut and scored portion over ejector 42 and die 41 beneath plunger 55, the feed rolls coming to rest; the cutting devices again descend to cut and score for a new blank, the cutter 39 cuts off the blank that is over die 41, and plunger 55 descends, pushing such severed blank against ejector 42, forcing said ejector and blank down into the die, and the cross bar 59 comes to rest temporarily. The shape of the die and plunger is such that as the blank is forced into the die the side members e and the end flaps c are folded upwardly, while the end members d are folded upwardly and also toward each other, lapping the adjacent flaps c and one another at their end portions. While the blank is being pushed into the die the grippers 47 rise and push the flaps c against the corresponding ends of plunger 55, before the end members are folded outside of the flaps c, so that the members d will properly lap over the flaps c and not interfere with them during the folding operation. The staple forming and driving devices then operate and drive the staples f at the ends of the blank through the corresponding flaps c and the overlapping end members d, the staple drivers then remaining set against the staples. Cross bar 59 then descends farther, causing the bar 56 to descend and, through the links 68, causing the slides 70 to advance toward the staples, thereby swinging the staple setting members 73, 74 from the normal positions of Fig. 9 to the positions of Fig. 8, thereby engaging the ends of the staples then projecting through the dish parts c, d, and clenching the staples on the inside of the thus completed dish. The cross bar 59 now rises, causing slides 70 and staple clenchers 73, 74 to return to the normal positions, and thereupon the plunger 55 is raised and comes to rest, while the grippers 47 release the dish, and ejector 42 rises and lifts the dish from die 41, the dish then remaining upon the plate 43, and the staple forming and driving devices return to normal. Thereupon the dish removing gripper 100 advances, grips the dish, and lifts it away from the die. The gripper 100 carries the dish beneath the dish releasing member 122 which descends, (while the gripper members open), and member 122 carries the dish down upon the bottom of receptacle 121. Thereupon fingers 137 advance against the dish, tilt it and slide it along receptacle 121 to one side of stops 147, (member 122 rising during such time) and the fingers 150 bear lightly against the upper edge of the dish, tucking or pushing the dish backwardly, thereby nesting the dishes as they are delivered. During each time that gripper 100 removes a dish from the die, and while the dish is being nested in receptacle 121, the paper strip is fed forward a step, and a blank is cut off, shaped and stapled, and another part of the strip cut and scored for a new dish, and so on continuously, the strip being cut and scored for a blank, the blank being formed to shape and stapled, and a finished dish moved from the die and nested, in a simultaneous and continuous manner.

Having now described my invention what I claim is:

1. The combination of blank forming devices, a die and plunger for folding the blanks to the required shape, means for driving staples into the blank, staple clenchers carried by the plunger, a slide guided to slide along the plunger, projecting and reentrant parts operatively connecting the slide with the clenchers to actuate the same, a support for operating the plunger, spring means interposed between said support and plunger to permit one to move relatively to the other, and means between said support and slide for operating along the plunger to clench a staple in a blank held by the plunger.

2. The combination of blank forming devices, a die and plunger for folding the blanks to the required shape, means for driving staples into the blank, staple clenchers carried by the plunger, a slide guided to slide along the plunger, projecting and reentrant parts operatively connecting the slide with the clenchers to actuate the same, a bar, means movably supporting the plunger from said bar, spring means between the bar and plunger to permit one to move relatively to the other, and means interposed between said bar and slide for reciprocating the latter along the plunger to clench a staple after the plunger is at rest.

3. The combination of blank forming devices, a die and plunger for folding the blanks to the required shape, means for driving staples into the blank, staple clenchers carried by the plunger, a slide carried by the plunger operatively connected with the clenchers to actuate the same, a bar, and means movably supporting the plunger from said bar, a link movably connecting said bar with said slide to actuate the latter for clenching a staple after the plunger bears on the blank.

4. The combination of blank forming devices, a die and plunger for folding the blanks to the required shape, means for driving staples into the blank, staple clenchers carried by the plunger, a slide carried by the plunger operatively connected with the clenchers to actuate the same, a bar, rods movably supporting the plunger from said bar, and a link movably connecting said bar with said slide adapted to cause the clenchers to clench a staple after the plunger bears against a blank.

5. The combination of a die, a plunger to coact therewith, means to reciprocate the plunger, staple driving devices at opposite ends of the die, staple clenchers at opposite ends of the plunger, means carried by the plunger and connected with said clenchers to operate them, a head to support the plunger, means to permit the plunger to move relatively to said head, and means movably connecting said head with said clencher operating means to cause the latter to operate the clenchers to clench staples after the plunger has pushed a blank into the die.

6. The combination of a die, a plunger to coact therewith, means to reciprocate the plunger, staple driving devices at opposite ends of the die, staple clenchers at opposite ends of the plunger, slides carried by the plunger and operatively connected with said clenchers, a head to support the plunger, rods movably supporting the plunger from said head, and links movably connecting said slides with said head for actuating said slides and clenchers to clench staples after the plunger has entered the die.

7. The combination of blank forming devices, a die and plunger for folding the blanks to the required shape, a gripping rod normally retracted from the die and guided at the end of the die to force portions of the blanks toward the plunger after the blank is in the die, means to reciprocate said rod, and stapling devices adjacent to the end of the die.

8. The combination of blank forming devices, a die and plunger for folding the blanks to the required shape, stapling devices at the ends of the die for securing portions of the blank together, a slide, means to reciprocate the slide, a gripper having a plurality of members carried by the slide to remove the folded blank from between the plunger and die, a rod connected with one of said gripper members to operate it, a rod connected with the first named rod, a lever pivotally connected with the second named rod, and means to operate said lever to actuate said gripper member to open and close the gripper in different positions of the slide with respect to the die.

9. The combination of blank forming devices, a die and plunger for folding the blanks to the required shape, means for securing portions of the blank together, a slide, a gripper having a plurality of members carried by the slide to remove the folded blank from between the plunger and die, a rod connected with one of said gripper members to operate it, an arm pivotally connected with said slide, means to rock said arm, a link connected with said rod, an arm pivotally connected with said link, and means to rock said arm for operating the movable gripper member.

10. The combination of blank forming devices, a die and plunger for folding the blanks to the required shape, means for securing portions of the blank together, a slide, means to reciprocate the slide, a gripper having a plurality of members carried by the slide to remove the folded blank from between the plunger and die, a rod connected with one of the gripper members to operate it, a rod connected with the first named rod, a lever pivotally connected with the second named rod, and means to operate said lever to actuate said gripper member, a receptacle for receiving dishes from the gripper, a member above said gripper, means to move the member down to the receptacle to push dishes from the gripper down upon the bottom of the receptacle, and means to slide the dishes away from said member.

11. The combination of blank forming devices, a die and plunger for folding the blanks to the required shape, means for securing portions of the blank together, a slide, means to reciprocate the slide, a gripper having a plurality of members carried by the slide to remove the folded blank from between the plunger and die, a rod connected with one of the gripper members to operate it, a rod connected with the first named rod, a lever pivotally connected with the second named rod, and means to operate said lever to actuate said gripper member to open and close the gripper in different positions of the slide with respect to the die, a receptacle for receiving dishes from the gripper, a member above said gripper, means to move the member down to the receptacle to push dishes from the gripper down upon the bottom of the receptacle, a finger projecting through a slot in the bottom of the receptacle, a rod carrying said finger, and means to raise and lower said rod and reciprocate it to actuate the finger.

12. The combination of blank forming devices, a die and plunger for folding the blanks to the required shape, means for securing portions of the blank together, a slide, means to reciprocate the slide, a gripper having a plurality of members carried by the slide to remove the folded blank from between the plunger and die, a rod connected with one of the gripper members to operate it, a rod connected with the first named rod, a lever pivotally connected with the second named rod, and means to operate said lever to actuate said gripper member to open and close the gripper in different positions of the slide with respect to the die, a receptacle for receiving dishes from the gripper, a member above said gripper, means to move the member down to the receptacle to push dishes from the gripper down upon the bottom of the receptacle, a finger projecting through a slot in the bottom of the receptacle, a rod carrying said finger, an arm pivotally supporting said rod, a crank connected with said arm to rock it, and a cam coacting with said rod to raise and lower said finger while it is being reciprocated to cause the finger to move dishes from the last named member.

13. The combination of blank forming devices, a die and plunger for folding the blanks to the required shape, stapling devices at the ends of the die for securing portions of the blank together, a gripper having a plurality of members to grip dishes, means to operate the gripper to open and close the gripper in different positions of the slide with respect to the die, a receptacle for receiving dishes from the gripper, a member above said gripper, means to move the member down to the receptacle to push dishes from the gripper down upon the bottom of the receptacle, a finger projecting through a slot in the bottom of the receptacle, a rod carrying said finger, means to raise and lower said rod and reciprocate it to actuate the finger, a pin overlying and adapted to engage the upper edges of dishes, and means to move said pin in a curvilinear path to engage the upper edges of dishes and push them along the receptacle.

14. The combination of blank forming devices, a die and plunger for folding the blanks to the required shape, stapling devices at the ends of the die for securing portions of the blank together, a gripper having a plurality of members to grip dishes, means to operate the gripper to open and close the gripper in different positions of the slide with respect to the die, a receptacle for receiving dishes from the gripper, a member, means to move the member down to deposit dishes upon the bottom of the receptacle, a finger projecting through a slot in the bottom of the receptacle, a rod carrying said finger, means to raise and lower said rod and reciprocate it to actuate the finger, a pin lying horizontally over and adapted to engage the upper edges of dishes, an arm carrying said pin, means for slidably and pivotally supporting said arm, and means to actuate said arm in a curvilinear direction to cause said pin to engage the upper edges of dishes and push them along the receptacle.

15. The combination of blank forming devices, a die and plunger for folding the blanks to the required shape, means for securing portions of the blank together, a gripper having a plurality of members to grip dishes, means to operate the gripper to open and close the gripper in different positions of the slide with respect to the die, a receptacle for receiving dishes from the gripper, means to deposit dishes upon the bottom of the receptacle, a finger to slide dishes along the receptacle, a rod carrying said finger, means to raise and lower said rod and reciprocate it to actuate the finger, a pin adapted to engage dishes, a forked arm, one member of said arm carrying said pin, a gear operatively connected with another member of said arm, a slide pivotally connected with said arm, and means for supporting said slide.

16. The combination of a plunger, a staple clencher carried thereby, a slide carried by the plunger, projecting and reëntrant parts operatively connecting the slide with said clencher, means to support the plunger, springs to move the plunger away from said means, and means to move said slide independently of the operation of the plunger, with a die below the plunger, whereby the plunger will be pressed by the springs in the die while the slide is moved on the plunger.

17. The combination of a plunger, a bar, rods slidably connecting the bar and plunger to support the plunger, springs between the plunger and bar, a staple clencher carried by the plunger, a slide carried by the plunger and operatively connected with the clencher, a link pivotally connecting the slide with the bar and a die opposed to the plunger whereby the bar and links may move relatively to the plunger while the latter presses a blank in the die.

18. The combination of a die and plunger adapted to fold a blank, a gripper normally retracted from the die and adapted to enter the die to grip a portion of the blank against the plunger when the latter has pushed the blank in the die, and means to operate said gripper.

19. The combination of a die and plunger adapted to fold a blank, a gripper normally retracted from the die and adapted to enter the die to grip a portion of the blank against the plunger when the latter has pushed the blank in the die, a spring to operate said gripper in one direction, and a cam and lever to operate the gripper in another direction.

Signed at New York city, in the county of New York, and State of New York, this 27th day of February, A. D. 1914.

ISRAEL PITKOWSKY.

Witnesses:
T. F. BOURNE,
MARIE F. WAINWRIGHT.